United States Patent [19]

Funada et al.

[11] 4,425,029

[45] Jan. 10, 1984

[54] FLUORESCENT LIQUID CRYSTAL DISPLAY DEVICES

[75] Inventors: Fumiaki Funada, Yamatokoriyama; Masataka Matsuura, Tenri; Tomio Wada, Nara, all of Japan

[73] Assignee: Sharp Kabushiki Kaisha, Osaka, Japan

[21] Appl. No.: 246,190

[22] Filed: Mar. 23, 1981

[30] Foreign Application Priority Data

Mar. 26, 1980 [JP] Japan .................................. 55-39520

[51] Int. Cl.³ ............................................. G02F 1/13
[52] U.S. Cl. ................................ 350/338; 350/350 F; 350/339 F
[58] Field of Search .............. 350/339 F, 350 F, 338, 350/349

[56] References Cited

U.S. PATENT DOCUMENTS

| | | | |
|---|---|---|---|
| 3,385,469 | 2/1975 | Asai et al. | 350/339 F |
| 4,154,746 | 5/1979 | Huffman | 350/349 |
| 4,185,894 | 1/1980 | Hilton et al. | 350/338 |
| 4,211,473 | 7/1980 | Shanks | 350/338 |

OTHER PUBLICATIONS

Sato, S. et al., "Multicolor Fluorescent Liquid-Crystal Display Concepts", *Applied Physics Lett.*, vol. 37, No. 8, (Oct. 15, 1980).

Primary Examiner—John K. Corbin
Assistant Examiner—Richard F. Gallivan
Attorney, Agent, or Firm—Birch, Stewart, Kolasch & Birch

[57] ABSTRACT

A fluorescent liquid crystal display of the type for reflecting radiation comprises a fluorescent material contained within a liquid crystal material for providing fluorescence in response to absorbance, and a filter element for reflecting at least one of the fluorescence and the absorbance and, if necessary, for showing low reflection in connection with radiation except for the at least one of the fluorescence and the absorbance to thereby enhance display contrast of the display.

4 Claims, 5 Drawing Figures

FLUORESCENT LIQUID CRYSTAL DISPLAY DEVICES

BACKGROUND OF THE INVENTION

The present invention relates to liquid crystal display devices and, more particularly, to fluorescent liquid crystal display devices comprising liquid crystal display materials and fluorescent materials dissolved therein. Light scattering conditions occur within the fluorescent liquid crystal display devices in response to external excitation such as by an electric field, whereby visible fluorescence emitted from the fluorescent material effectively escapes from the liquid crystal materials.

Generally known as electro-optical effects of liquid crystals are the dynamic scattering effect, twisted nematic electric field effect, guest-host effect, cholesteric-nematic phase transition effect, and so forth. These electro-optical effects provide displays by the scattering or absorption of ambient light, as distinguished from the effects of luminescent materials which per se produce luminescent displays such as lamp displays, luminescent diode displays, electroluminescence displays, plasma displays or the like. The displays resorting to the electro-optical effects are advantageous over those of the latter type in that they involve reduced energy consumption, but have the drawback of lacking brilliance.

The present invention has overcome the above problem and provides novel useful display devices which have the low power consumption characteristics of so-called passive displays not luminescent in themselves and which incorporate a self-luminescent component for giving a brilliant active display.

R. D. Larrabee has already proposed to add a fluorescent material to a liquid crystal material and vary the fluorescent intensity of the material by electric field (RCA Review, Vol. 34, P 329, 1973). However, his paper states that he failed to find liquid crystal materials which do not absorb ultraviolet light at room temperature. This appears attributable to the fact that when causing a fluorescent material in a liquid crystal material to absorb a varying amount of light in accordance with the orientation of the liquid crystal to vary the fluorescence intensity with the light absorption, the exciting light is absorbed by the liquid crystal layer without effectively exciting the fluorescent material.

U.S. Pat. No. 3,844,637 discloses fluorescent liquid crystal compositions comprising 4'-methoxy-(or -ethoxy-) benzylidene-4-n-butylaniline as a liquid crystal material. However, the compositions per se absorb violet light or near ultraviolet light without permitting effective excitation of the fluorescent material.

OBJECTS AND SUMMARY OF THE INVENTION

In view of the foregoing, it is an object of the present invention to provide novel luminescent display devices of the low power consumption type with the use of liquid crystal materials which cause the light scattering phenomena in response to external stimulation by an electric field, a magnetic field, thermal excitation or mechanical force in any one of the nematic, smectic, and cholesteric mesophases.

It is another object of the present invention to provide novel luminescent display devices of the low power consumption type with the liquid crystal materials.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a fluorecent liquid crystal display of the type for reflecting radiation comprises a fluorescent material contained within a liquid crystal material for providing fluorescence in response to absorbance, and a filter element for reflecting at least one of the fluorescence and the absorbance and, if necessary, for showing low reflection in connection with radiation except for the at least one of the fluorescence and the absorbance to thereby enhance display contrast of the display.

BRIEF DESCRIPTION OF THE DRAWINGS

The present invention will become more fully understood from the detailed description given hereinbelow and accompanying drawings which are given by way of illustration only, and thus are not limitative of the present invention and wherein.

DESCRIPTION OF THE INVENTION

Figure 1:
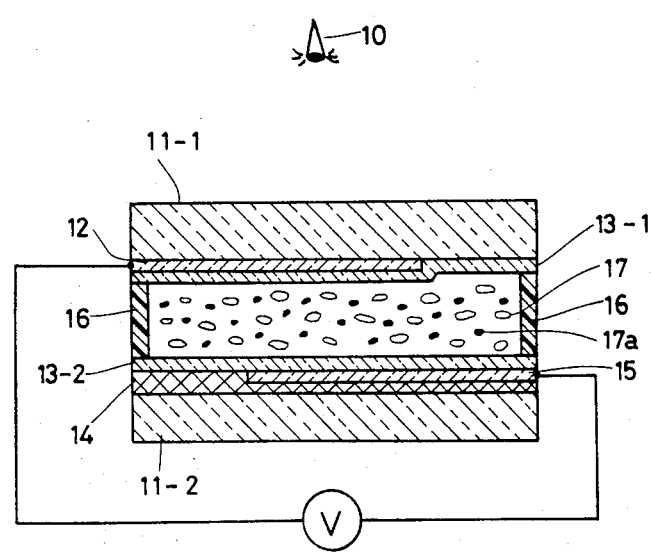
FIG. 1 is a sectional view of a reflective type of fluorescent liquid crystal display device according to the present invention.

The present invention is characterized in that the liquid crystal material adapted to the present invention insures the light scattering phenomena in response to external excitation by an electric or magnetic field, thermal rising, or a mechanical shock irrespective of its mesophase such as nematic, cholesteric, or smectic. More particularly, for example, the light scattering phenomena are a dynamic scattering mode of the liquid crystal materials where an electrolyte such as quaternary Anmonium salt is added to the nematic liquid crystal materials with a negative dielectric anisotropy, a memory effect of the mixed liquid crystal material comprising the nematic and colesteric liquid crystal material and a phase transition effect that the liquid crystal materials cause the transformation from the Grandjean textures of the cholesteric mesophase to the focalconic textures of the same and finally to the nematic mesophase.

The liquid crystal materials adapted to the fluorescent liquid crystal display device contain individually or in combination various additions for giving a predetermined conductivety, activating agents for controlling pitches of the cholesteric mesophase, or orientation agents for causing the orientation of the liquid crystal materials.

The present invention is featured by dissolving or disposing an organic fluorescent material in a liquid crystal material. The liquid crystal material exhibits a light scattering phenomena in response to exciting means to propagate both incident light from the fluorescent material and fluorescence developed from the same. A cell is provided for containing the liquid crystal material in film conditions. A display area of the cell makes it possible to propagate the incident light and the fluorescence.

Examples of suitable liquid crystal materials adapted to the present invention are as follows, in their molecular formula:

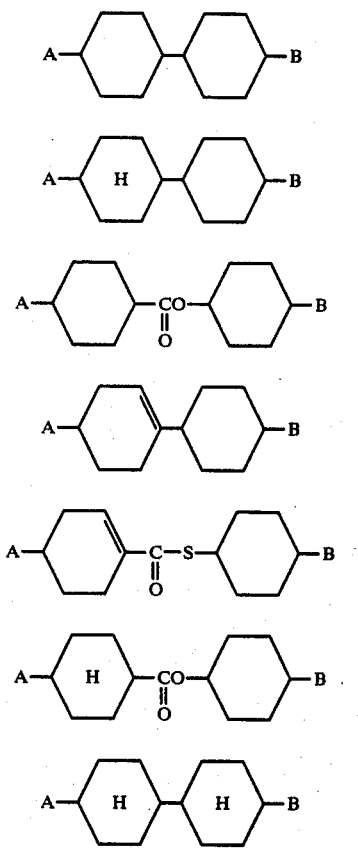

In the above molecular formula, A and B represent an alkyl group, alkoxy group, alkoxycarbonyl group, and cyano group. Useful liquid crystal materials are not limited to these examples.

The fluorescent materials adapted to the present invention should be easily dissolved or dispersed in a liquid crystal material. The fluorescent materials must generate fluorescence with efficiency in response to the excitation applied thereto. It is desirous that the fluorescent materials provide a high degree of pleochroism. The fluorescent materials should not be damaged as to their light properties owing to the excitation radiation.

Examples of fluorescent materials useful in this invention are usually aromatic compounds such as anthracene, tetracene, pyrene, Pyronin G, Pyronin B, Rhodamine 6G perchlorate, cryptocyanine, Coumarin 6, Coumarin 7, Fluorescein, 9,10-dimethylanthracene, 9,10-diphenylanthracene, perylene, fluorene, p-quaterphenyl, rubrene, terphenyl, 2,5-diphenylfuran, 2,5-diphenyloxazole, 2-phenyl-5-(4-biphenylyl-1,3,4-oxadiazole, 1,4-bi[2-(5-phenyloxazolyl] benzene, Samaron Brilliant Yellow H6GL, Brilliant Phosphine, Primulin 0,1,8-diphenyl-1,3,5,7-octatetracene, Acridine Yellow, Thioflavine S. P ronin GS, 1,12-benzperylene, and so forth. Useful materials are not limited to these examples.

It is required that the fluorescent liquid crystal display device containing the liquid materials inclusive of the fluorescent materials pass spectra in the excitation radiation to be applied to the fluorescent materials and spectra in the fluorescence developed from the fluorescent materials.

According to a preferred form of the present invention, a reflective type of fluorescent liquid crystal display device comprising a sandwich-type electrode arrangement by means of the external excitation of an electric field will be described.

With reference to FIG. 1, the fluorescent liquid crystal display device comprises a transparent upper substrate 11-1, a transparent lower substrate 11-2, a display electrode 12, a counter electrode 15, two transparent insluating layers 13-1 and 13-2, a selective and reflective layer 14, spacers 16, and a layer containing liquid crystal molecules 17 and fluorescent materials 17a.

Each of the substrates 11-1 and 11-2 is made of soda glass with a thickness of about 1 mm. The display electrode 12 is made of $In_2O_3$ or the like with a thickness of about 500 Å, by evaporation or the like. It is patterned desirably as minus-in-square configuration or the like. On the display electrode 12, the transparent insulating layer 13-1 is formed made of $SiO_2$ or the like.

As a feature of the present invention, the selective and reflective layer 14 is disposed on the substrate 11-2. Over the layer 14, the counter electrode 15 is positioned which is made of a transparent material such as $In_2O_3$. On the layer 15, the transparent insluating layer 13-2 is disposed made of $SiO_2$ or the like with a thickness of about 500 Å.

For the liquid crystal orientation purpose, the rubbing layer and the layer of angular deposition are coated by a layer of surfactant having long-chain alkyl or long-chain fluoroalkyl or containing a silane compound having one or more amino groups.

The layer of surfactant serves to orientate the long axis of liquid crystal molecules perpendicular to the plane of the transparent upper substrate 11-1 and the lower substrate 11-2. The liquid crystal molecule orientation layers cover a display area provided by the display electrode 12 and a background area surrounding the display area.

An example of such a layer of surfactant is Acid-T which is commercially available from Merck & Co., Inc.

The selective and reflective layer 14 comprises a first film made of Al or the like functioning to reflect all the radiation belonging to the visible region, and a second film made of a selectively absorbing filter such as polyacetate or glass with a dye functioning to absorb only specific wavelength radiation.

Figure 2:
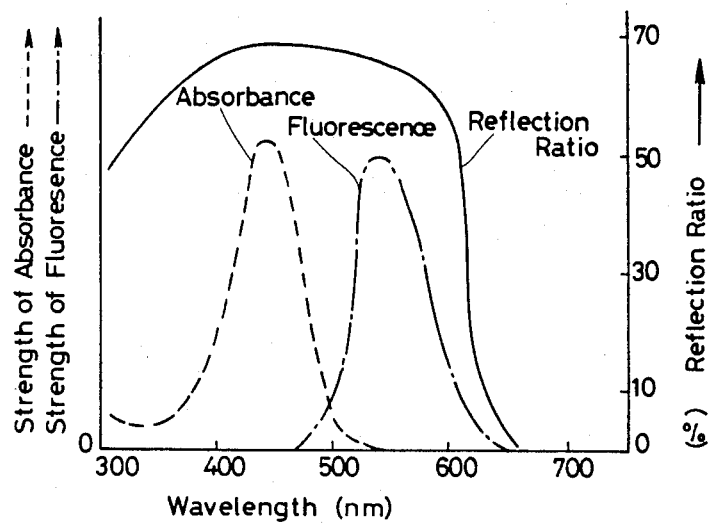
FIG. 2 is a graph showing reflective characteristics obtained by a selectively reflective film adapted for the device of the present invention.

FIG. 2 shows a graph representing reflective characteristics provided by the selective and reflective layer 14. This layer 14 has a high reflection ratio in connection with the absorbed radiation and the fluorescence by the fluorescent materials 17a in order that the fluorescent materials 17a are excited. In addition, this layer 14 has a low reflective ratio in connection with other visible radiations.

The films of the layer 14 can be replaced by the so-called interference color filter for absorbing or reflecting a specific radiation only.

The spacers 16 are used to form a container filled with the liquid crystal layer by combining the substrates 13-1 and 13-2, preferably, with a distance of about $0.1\mu$. The spacers 16 may be made of epoxy resin or the like.

For example, the liquid crystal materials 17 are a liquid crystal mixture of nematic type 605 produced by Hoffman-La Roche Inc. added by an optical active agent CB-15 produced by BDH Chemicals Ltd. of about 15 weight % to form a mixed cholesteric liquid crystal mixture.

For example, the fluorescent materials 17a comprise Coumarin 7 of Eastman Kodak Company. The fluorescent materials 17a are dissolved or dispersed within the liquid crystal materials 17 with about 0.3 wt%.

According to the present invention, display elements in the display area are shown in bright illumination and, on the other hand, portions freed from the display elements are shown in dark conditions.

In the form of the present invention, cholesteric liquid crystal materials are applied to the display device wherein portions of the light scattering phenomena are placed in focal-conic textures in the cholesteric mesophase for display purposes and other portions peripheral to the display portions are placed in nematic mesophase in the homeotropic orientation by applying more field to the other portion than to the disiplay portions. That is called a transformation type of display cell from the cholesteric mosophase to the nematic mesophase.

When an appropriate electric field is applied between the transparent electrodes 12 and 15, incident radiation passes through the display side defined as the transparent substrate 11-1, the display electrode 12, and the insulating layer 13-1 and, besides, the liquid crystal layer 17.

Components within the incident radiation corresponding to the excitation radiation are highly reflected by the selective and reflective layer 14. Thus, eventually all of the fluorescent materials 17a are highly excited by the incident radiation and the reflected components thereof, accordingly. Besides, strong reflection of the fluorescence, which is generated by the fluorescent materials 17a and directed to the counter substrate 11-2, is caused by the selective and reflective layer 14 toward the display side.

According to the reflection of the incident radiation and the fluorescence of the present invention, a viewer 10 can catch a high contrast image display of the fluorescence.

Figure 5:
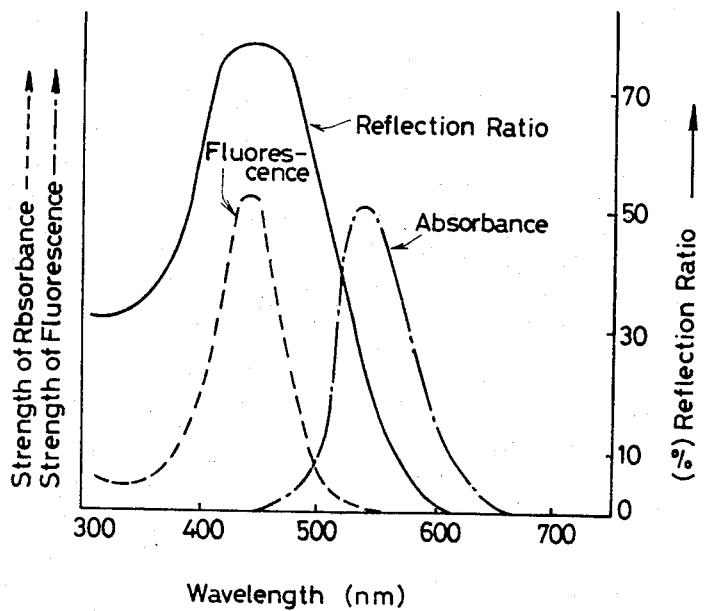

FIG. 5 shows a graph representing reflective characteristics provided by the selective and reflective layer 14. The characteristics of FIG. 2 is replaced by those of FIG. 5. As indicated in FIG. 5, the layer 14 has a high reflection ratio with respect to radiation which can be absorbed by the fluorescent materials 17a and a low reflection ratio with respect to radiation except for the absorptive radiation for those materials 17a.

With the provision of such a characteristic layer 14 indicated by FIG. 5, parts of incident radiation passing through the liquid crystal layer, the parts being absorbed by those materials 17a to excite them, are reflected by the layer 14 toward the liquid crystal layer containing the materials 17a. Accordingly, the absorbance by the materials 17a becomes more so that the fluorescence emitted by the materials 17a becomes more to thereby provide a high display contrast.

Figure 4:
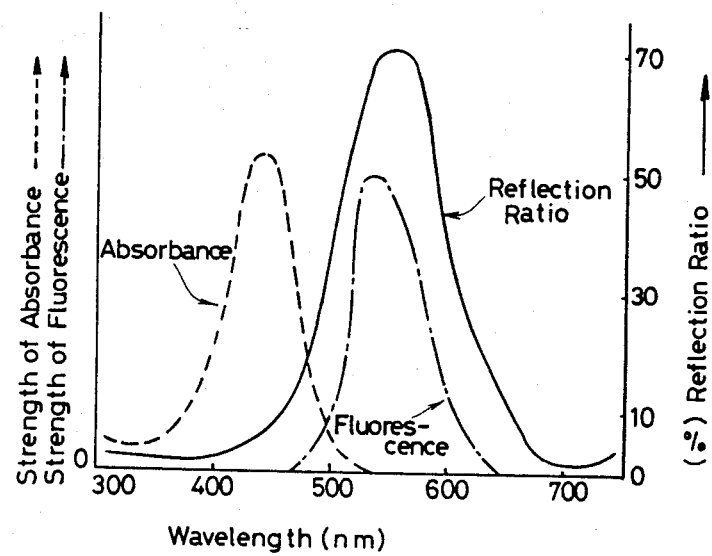
FIGS. 4 and 5 are graphs showing reflective characteristics obtained by other types of selectively reflective film adapted for the device of the present invention.

FIG. 4 shows a graph representing reflective characteristics provided by the selective and reflective layer 14. The characteristics of FIG. 2 is replaced by those of FIG. 5. As indicated in FIG. 5, the layer 14 is characterized by having a high reflection ratio in connection with the fluorescence provided by the materials 17a and a low reflection ratio in connection with radiation except for the fluorescence by the materials 17a.

According to such characteristics as shown in FIG. 4, the fluorescence directed to the counter substrate 11-2 is reflected by the layer 14 toward the display side so that a high display contrast is provided.

Figure 3:
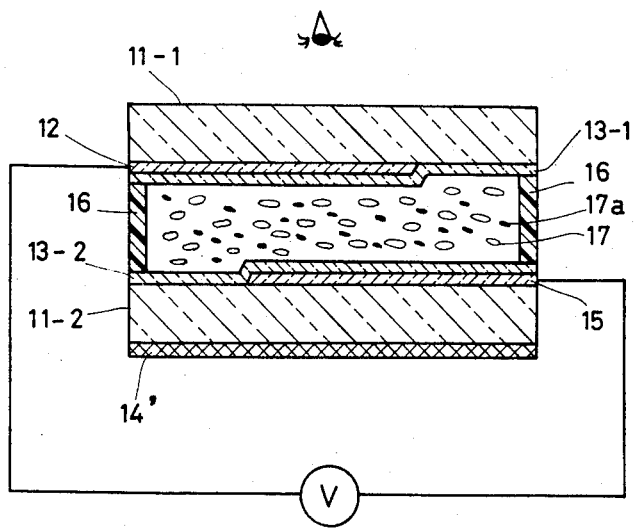
FIG. 3 shows a sectional view of another type of fluorescent liquid crystal display device of the present invention.

FIG. 3 shows a sectional view of another form of liquid crystal display according to the present invention. Like elements corresponding to those of FIG. 1 are indicated by like numerals.

The display device of FIG. 3 is different from that of FIG. 1 in that another selective and reflective layer 14' is additionally provided at the outer side of the counter substrate 11-2. This layer 14' comprises a first film made of a reflective material such as a metal, e.g., Al, and a second film made by printing an appropriate dye material such as blue ink. For example, some examples of such a layer 14' are blue filters of Model No. SP-6 or CC-30M both produced by Fuji Photo Film Co., Ltd. or a blue filter produced by Nippon Leaf Mfg. Co., Ltd. These kinds of layer 14' have properties of FIG. 4.

When an electric field, e.g., about $2.5 \times 10^4$V/cm or more is applied by a source voltage of about 25 V between the electrodes 12 and 15, a high contrast and blue image display is obtained. When an electric field, e.g., below about $2.5 \times 10^4$V/cm is applied by a source voltage below about 25 V between them, a high contrast and green image display is obtained. The green color is the color of the fluorescence by the fluorescent materials 17a.

Needless to say, the reflective characteristics of the layer 14' may be those of FIG. 2 or 5.

In conclusion, both or either of the layers 14 and 14' provides a high reflection ratio in connection with the absorbance by the fluorescent materials 17a and/or in connection with the fluorescence by them 17a, and, in addition, provides a low reflection ratio in connection with radiation except for the above highly reflected absorbance and/or fluorescence.

At least, both or either of these layers 14 and 14' provides a high reflection ratio in connection with the absorptive wavelength by the fluorescent materials 17a.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A fluorescent liquid crystal display of the type for reflecting radiation comprising:
    a fluorescent material contained within a liquid crystal material for providing fluorescence in response to absorbance, the wavelength band of the fluorescence being apart from that of the absorbance absorbed by the fluorescent material; and
    filter means for reflecting the absorbance and the fluorescence to enhance display contrast of the fluorescent liquid crystal display.

2. The display according to claim 1, wherein said filter means is for showing low reflection in connection with radiation except for the absorbance and the fluorescence.

3. The display according to claim 1, wherein the filter means is positioned between a display side substrate and a counter substrate defining a container for the liquid crystal material.

4. The display according to claim 1, wherein the filter means is positioned behind a counter substrate opposed to a display side substrate, the substrates defining a container for the liquid crystal material.

* * * * *